(12) United States Patent
Schütz (10) Patent No.: US 8,988,526 B2
(45) Date of Patent: Mar. 24, 2015

(54) DEVICE HAVING A CAMERA UNIT FOR RECORDING IMAGES OF THE OUTER AREA OF A MOTOR VEHICLE

(75) Inventor: Heiko Schütz, Velbert (DE)

(73) Assignee: Huf Hulsbeck & Furst GmbH & Co. KG (DE)

( * ) Notice: Subject to any disclaimer, the term of this patent is extended or adjusted under 35 U.S.C. 154(b) by 657 days.

(21) Appl. No.: 13/254,019

(22) PCT Filed: Mar. 26, 2010

(86) PCT No.: PCT/EP2010/054010
§ 371 (c)(1),
(2), (4) Date: Aug. 31, 2011

(87) PCT Pub. No.: WO2010/112424
PCT Pub. Date: Oct. 7, 2010

(65) Prior Publication Data
US 2012/0007984 A1    Jan. 12, 2012

(30) Foreign Application Priority Data
Apr. 2, 2009   (DE) .......................... 10 2009 015 610

(51) Int. Cl.
*H04N 7/18*    (2006.01)
*B60R 11/04*   (2006.01)
*B60R 11/00*   (2006.01)

(52) U.S. Cl.
CPC ........... *B60R 11/04* (2013.01); *B60R 2011/004* (2013.01); *B60R 2011/0082* (2013.01); *B60R 2011/0085* (2013.01); *B60R 2011/0092* (2013.01); *B60R 2011/0094* (2013.01)
USPC ........................................................ 348/148

(58) Field of Classification Search
USPC .................................. 348/118, 148; 359/823
See application file for complete search history.

(56) References Cited

U.S. PATENT DOCUMENTS 4,104,662 A * 8/1978 Fukuda .......................... 396/350
7,773,321 B2 * 8/2010 Matsui et al. ................. 359/823
(Continued)

FOREIGN PATENT DOCUMENTS

DE    102004050297 A1    4/2006
DE    102004050298 A1    4/2006
(Continued)

OTHER PUBLICATIONS

Chinese Office Action dated Apr. 19, 2013—regarding Application No. 201080014924.7.
(Continued)

*Primary Examiner* — Dave Czekaj
*Assistant Examiner* — Tracy Li
(74) *Attorney, Agent, or Firm* — Cantor Colburn LLP (57) ABSTRACT

The invention relates to a device comprising a camera unit (10), which is used to record images of the outer area of a motor vehicle, comprising a camera (11), which is accommodated in a housing (12) of the camera unit (10) so as to be movable between a retracted position and an image recording position. According to the invention, at least one first slotted guide (15) is provided for guiding the motion of the camera (11) between the retracted position and the image recording position, wherein at least one sliding element (21) is arranged on the camera (11), which sliding element is guided in the slotted guide (15) to guide the motion of the camera (11) between the retracted position and the image recording position.

12 Claims, 5 Drawing Sheets

(56) References Cited

U.S. PATENT DOCUMENTS

| | | | |
|---|---|---|---|
| 2004/0057720 A1* | 3/2004 | Westerweck et al. | 396/448 |
| 2005/0001901 A1* | 1/2005 | Eggers et al. | 348/118 |
| 2005/0253960 A1* | 11/2005 | Nakamura | 348/373 |
| 2006/0018654 A1* | 1/2006 | Nuno et al. | 396/349 |
| 2008/0117527 A1* | 5/2008 | Nuno et al. | 359/687 |

FOREIGN PATENT DOCUMENTS

| | | |
|---|---|---|
| DE | 602004003255 T2 | 5/2007 |
| DE | 102006039192 A1 | 2/2008 |
| DE | 102007052402 A1 | 5/2009 |
| EP | 1529688 A1 | 5/2005 |
| JP | 2-31957 A | 2/1990 |
| JP | 11-165538 A | 6/1999 |
| JP | 2001-58543 A | 3/2001 |

OTHER PUBLICATIONS

P.R. China Office Action issued Sep. 27, 2013; re: Chinese Application No. 201080014924.7; citing: DE102006039192A1, JP2001-58543A, EP1529688A1, DE102004050297A1 and JP11-165538A.

P.R. China Search Report issued Sep. 10, 2013; re: Chinese Application No. 201080014924.7; citing: DE102004050297A1, EP 1529688A1 and JP2001-58543A.

International Search Report issued May 26, 2010 by European Patent Office re: PCT/EP2010/054010; citing DE 10 2006 039192 A1.

* cited by examiner

FIG.5

DEVICE HAVING A CAMERA UNIT FOR RECORDING IMAGES OF THE OUTER AREA OF A MOTOR VEHICLE

TECHNICAL FIELD

The present invention involves a device with a camera unit, which serves to capture video images of the external area of a motor vehicle with a camera that is incorporated into a casing of the camera unit and can move between a withdrawn position and a video image position.

BACKGROUND

There are various devices with a camera unit known in the current state of technology, whereby the camera unit is frequently designed with a closure unit, which also is a component of the device and which can be installed on the rear of a motor vehicle. These types of camera units include a camera that is held in a casing and can move between a withdrawn position and a video image position.

For example, these types of camera units can be used to be of assistance when parking motor vehicles. If, for example, the transmission gear is put in reverse, the camera moves from the withdrawn position to the video image position and the camera is at least partially guided out of an opening in the casing of the camera. Thus, the area behind the motor vehicle is captured as an image through the camera and is shown on a display for the driver of the motor vehicle. If the driver has stopped backing up and the transmission gear is taken out of reverse, the camera can be moved back again from the video image position to the withdrawn position.

According to the present design of the camera unit, a cover piece is designed to protect the camera from getting dirty, at least in the withdrawn position. The cover piece can close off the opening in the casing of the camera unit in the withdrawn position. Consequently, for the transfer from the withdrawn position to the video image position of the camera, the cover piece must be moved between a closed position and an open position when the camera is switched from the withdrawn position to the video image position.

In DE 60 2004 003 255 T2, a camera unit is unveiled that serves as parking assistance for the driver of a vehicle. The camera unit features a cover piece that is movable from a closed position to an open position, and vice versa. However, the activation of the cover piece and the activation of the camera feature a complex structure with a number of individual elements.

DE 10 2007 052 402 unveils another device with a camera unit, which serves to capture video image of the external area of a motor vehicle. The movement of the cover piece shown therein relative to the camera is comprised of several movement steps, such that a complex kinematic activation of the cover piece is necessary. In particular, a linear motion of the camera must be combined with a lifting-swiveling movement of the cover piece. Causing these types of movements disadvantageously requires a substantial construction-related effort, and the movement track of the camera and the cover piece must always take place in the context of a space of movement that is too minimal.

A camera unit with a camera is known from JP 02 031 957 A, in which the movement of the camera between the withdrawn position and the video image position is generated via a spindle, which by a drive unit, can be shifted, e.g. by a rotating motor to a rotational movement. The camera is fastened to a spindle nut that runs along the extension of the spindle if it is rotating. However, these types of spindle-nut systems are very slow to generate the movement of the camera and, if applicable, a cover piece on the camera because the speed of the nut on the spindle is determined by the gradient of the spindle thread. Moreover, a spindle-nut system causes more operational noises, which are regarded as a disadvantage.

BRIEF SUMMARY

Thus, the invention provides a device with a camera unit to capture video images of the external area of a motor vehicle, which overcomes the disadvantages of the previously identified state of technology and possesses a simple, robust and reliable structure. In addition, generating movement of the camera should be enabled in a simple way.

More particularly, the invention provides a camera unit to capture video images of the external area of a motor vehicle in connection with the features identified. Advantageous, additional improvements of the invention are listed in the dependent features.

The invention involves the technical theory that at least one connecting track is designed to guide the movement of the camera between the withdrawn position and the video image position and at least one sliding piece is located directly or indirectly on the camera. The sliding piece is guided in the connecting track to guide the movement of the camera between the withdrawn position and the video image position.

The invention presumes that at least one connecting track should be used through which the movement of the camera can be guided between the withdrawn position and the video image position. A connecting track is presently understood to be a geometrical, specially-designed slideway in a frame so that a sliding piece can slide in the slideway. The connecting track can be designed geometrically so that the movement of the camera is guided between the withdrawn position and the video image position in a defined way. Consequently, the geometric configuration of the slideway of the connecting track can thus be optimized such that the camera can cross over without using additional mechanical components, e.g. from a swiveling movement into a linear motion. The result is that the camera can require a minimum space of movement between the withdrawn position and the video image position because the geometric configuration of the connecting track can be made accordingly. Of course, the connecting track can also be available on the camera so that the sliding piece is fastened to that area, e.g. on the casing of the camera unit, and consequently the camera can attain the same guiding effect of the camera in the casing.

As per an advantageous, additional improvement of the device, a cover piece can be designed that serves at least to close an opening present in the casing, if the camera is in the withdrawn position. The casing features the opening so that the camera can at least be partially guided out of the casing when in the video image position. If the camera is in the withdrawn position, the cover piece serves to close the opening in order to prevent dirt from penetrating, so that the optical parts of the camera are kept from getting dirty. As per a particularly advantageous configuration, the cover piece is located on the camera and can be moved with the movement of the camera between the closed position and the open position. This results in a particularly advantageous arrangement because both the camera and the cover piece are guided by the same connecting guide since the cover piece moves with the movement of the camera. As a whole, the cover piece and the camera form a fixed connection, whereby the fixed connection is generated by a guide piece that can also be identified as a stopping piece of the cover piece.

It turned out to be particularly advantageous that the cover piece is located on the camera directly on or over at least one guide piece, whereby the configuration of the cover piece on the camera is preferably formed as a fixed configuration so that the cover piece can move with the movement of the camera between a closed position and an open position.

As per a particularly advantageous configuration of the connecting track, this can be designed in the casing of the camera unit. The casing can preferably feature two, plane-parallel and spaced casing walls opposite of each other so that a first connecting track can be brought into a first casing wall and a second connecting track can be brought into a second casing wall. Consequently, the connecting tracks are located opposite each other and a separate sliding piece be guided into each of the two connecting tracks, whereby the sliding piece can feature a cylinder form, and the rotational axes of the cylinder form of the sliding piece can be couched within each other.

The casing of the camera unit can be designed in two parts, whereby the first casing part forms a mounting plate, and the second casing part possesses a cap form, such that the camera can be set between the mounting plate and the cap. The respective connecting tracks are located both in the mounting plate and in the base area of the cap form so that the camera unit can be mounted properly.

A drive unit is designed to enable the movement of the camera between the withdrawn position and the video image position. The operative connection between the drive unit and the camera can include a lever piece that is incorporated within the casing by a rotational axis so that it is rotational. Hence, the lever piece can perform a swiveling movement around the rotational axis, whereby the first and the second end position of the swiveling movement correspond to the withdrawn position of the video image position. The level piece is preferably located within the casing, however the lever piece can also be present outside of the casing, depending upon the geometric design of the casing. For example, the casing can be designed as an open casing as this is constituted by a frame construction or through a semi-monocoque with a half-sided opening. The drive unit can be designed as an electromagnetic actuator with a lifting piece that is connected to the lever piece. Moreover, the drive unit can be designed as a rotating motor and/or as a central locking actuator, whereby the drive unit designed as a central locking actuator can preferably serve to activate the central locks of the motor vehicle. If the drive unit is designed as a rotating motor, a drive pinion can be designed, which is driven by the rotating motor. Moreover, a linkage piece can be present, which is located outside of the casing and is connected with the lever piece on the rotational axis in a way that the rotation is transferred, e.g. by a feather key, a multi-toothed connection or the like. The result of this is that upon linking the linkage piece with the drive unit, the lever piece can be turned on the rotational axis.

It is advantageous if the lever piece is designed as a gear segment so that the pinion can be brought to mesh with the gear segment like a comb. If the drive pinion rotates, the gear segment can perform a swiveling movement around the rotational axis, which also leads to a swiveling movement of the lever piece around the rotational axis. Independent of the type of construction of the drive unit, this can exhibit self-locking, whereby the self-locking is preferably enabled by an electro-motor drive unit. Consequently, a movement of the lever piece and thus a movement of the camera between the withdrawn position and the video image position can be exclusively caused by an electrical operation of the drive unit. In particular, the camera cannot be moved from the withdrawn position into the video image position from external intervention.

The camera is preferably connected loosely with the lever piece in a connection axis so that the position of the camera in the casing is defined via the entire movement of the camera, first through the guide of the sliding piece in the connecting track, and second through the position of the connection axis. Both the connection axis and the sliding piece thus form axes that preferably lie orthogonally on the extension level of the connecting track. This results in a two-sided guide of the camera and the cover piece in the casing and particularly between both casing walls. In this way, a particularly stable 4-point guide is created, which serves to determine the position of the camera and the cover piece via the movement between the withdrawn position and the video image position.

As per an additional improvement of the camera unit of the invention, the connecting track can feature an S-shaped pathway with at least one peak. The S-shaped pathway of the connecting track can be designed in such a way, and the peak can be located in such a way, that the space of movement of the camera necessary to reach the video image position, and preferably the cover element as well, is minimal, and/or the video image position of the camera, and particularly the cover piece, only require a minimum amount of space.

The camera can at least partially removed from an opening in the casing in the video image recording position, whereby the cover piece in its closed position can be brought against the opening, thereby sealing the structure. To achieve an improved sealant effect, a sealing piece can be located between the opening and the cover piece. In particular, soiling the camera is avoided, which without proper sealing in the external area of a motor vehicle can even make the camera stop functioning. In particular, the camera can take a withdrawn position in which there is a jacking force of the cover piece in the opening to further improve the sealant effect of the sealing piece. The sealing piece can both be brought into the opening and can be located on the sealing edge of the cover piece that is complementary to the opening.

As per a further improvement, the S-shaped pathway of the connecting track can be designed in such a way and, in particular, the peak is located in such a way that the movement of the camera and the movement pieces located on it, crosses over from the withdrawn position into the video image position by changing from a swiveling movement into, essentially, a linear motion. For example, the connecting track can, in a first section, conform to a circular path around the rotational axis so that the camera and the cover piece also then guide a purely swiveling movement around the rotational axis. This area of the connecting track can be connected to a linear or a reverse directional, extending, bow-shaped area. In this section the camera can leave the circular path and perform a straight movement or a reversed swiveling movement out of the opening of the casing. Thus, there is a more optimized space of movement of the camera and particularly the cover piece, which can be confined by alteration parts in the rear of a motor vehicle.

The desired path of motion of the camera from the withdrawn position to the video image position, and vice versa, can be specified in a simple way by the connecting track.

BRIEF DESCRIPTION OF THE DRAWINGS

Other measures improving the invention will be depicted more thoroughly in the following, jointly with the description of a design example of the invention and with figures.

DETAILED DESCRIPTION

Figure 1:
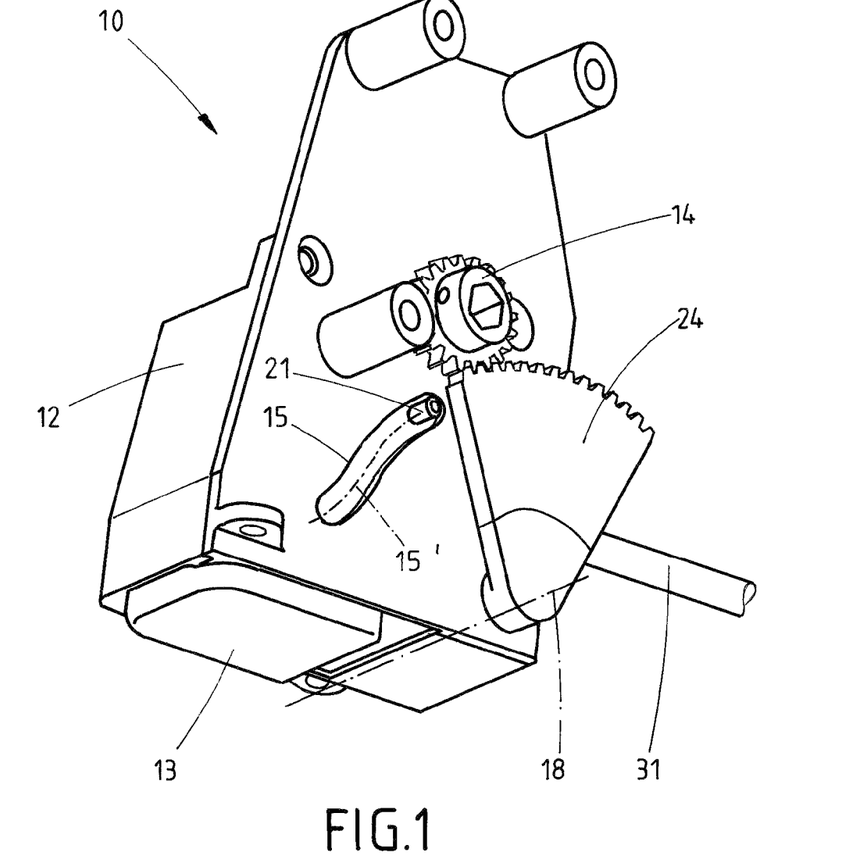
FIG. 1 a perspective view of a design example of the device with a camera unit, whereby the camera is in the withdrawn position and the cover piece is in the closed position, FIG. 2 a perspective view of the design example of the camera unit, as shown in FIG. 1, whereby the camera is in the video image position and the cover piece is in the open position, FIG. 3 a view of the camera unit, as shown in FIG. 1 or 2, but in a reverse view, FIG. 4 a perspective view of the design example of the camera unit without the casing, whereby the camera is shown in the withdrawn position and FIG. 5 a perspective view of the camera unit as shown in FIG. 4, whereby the camera is in the video image position.
Figure 2:
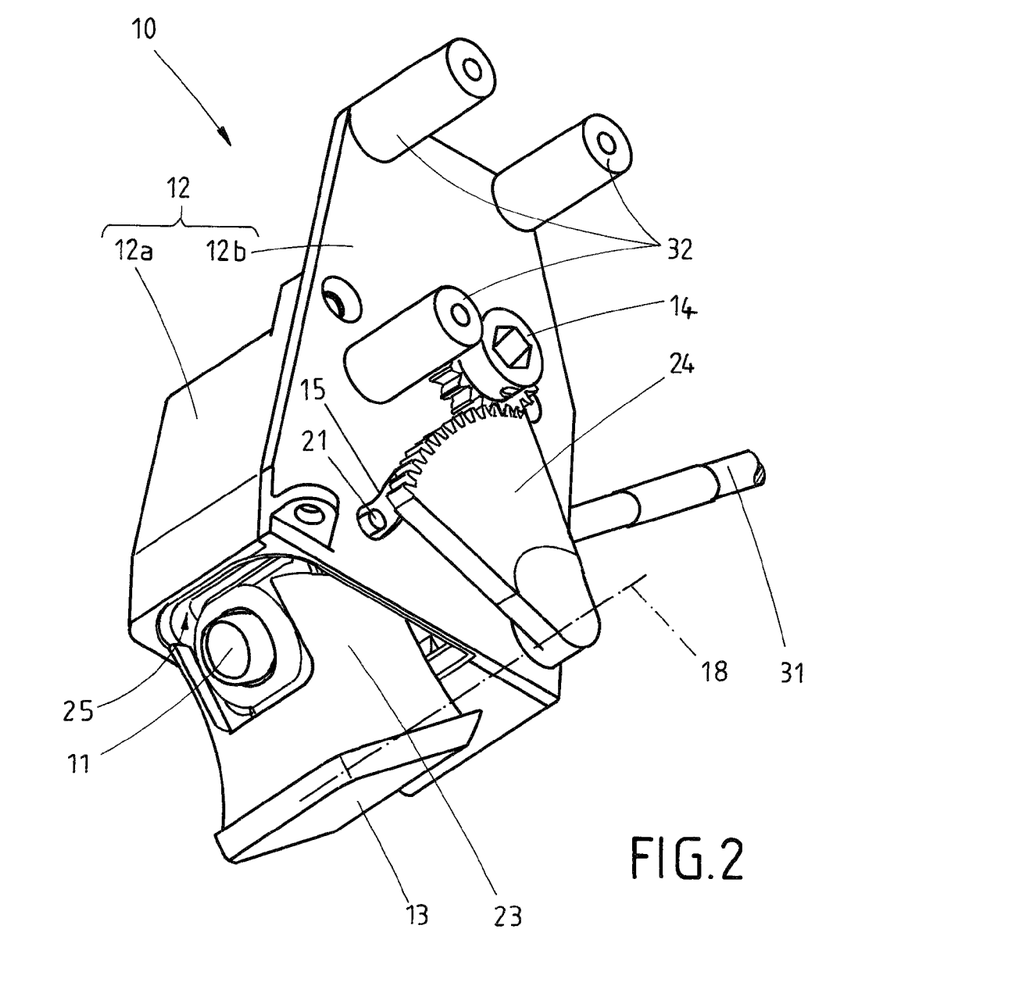

FIGS. 1 and 2 show a design example of the device according to the invention with a camera unit 10, which serves to capture video images of the external area of a motor vehicle. The camera unit 10 is a component of the device according to the invention, whereby an actuating piece is available in the rear of a motor vehicle as another component, which can be integrated jointly with the camera unit 10 as a modular unit to the rear of a motor vehicle. Capturing video images can serve as assistance to parking if the area behind the motor vehicle is recorded by camera unit 10, preferably to be shown via a display in the driver's area of visibility in the motor vehicle.

In FIG. 1, camera unit 10 is shown in a position that corresponds to the withdrawn position of camera 11. FIG. 2 shows camera unit 10 in a video image position in such a way that only in FIG. 2 is camera 11 displayed visibly. This can capture video images of the rear areas behind the motor vehicle and be connected via a cable 31 with electronic components in the motor vehicle that are allocated to camera 11. In FIG. 1, camera 11 is covered by casing 12 and cover piece 13, whereby in FIG. 2 camera 11 is guided out of opening 25 in casing 12, so that this position of camera 11 reflects the video image position. Cover piece 13 protects camera 11 from being soiled as shown in the image in FIG. 1 since opening 25 in casing 12 of camera unit 10 is closed by cover piece 13.

Cover piece 13 is indirectly but stiffly connected with camera 11 via guide piece 23. Consequently, there is no relative movement of cover piece 13 in relation to camera 11.

The movement guide of cover piece 13 from the closed position to the open position takes place solely by the movement guide of camera 11 between the withdrawn position and the video image position. To guide camera 11 jointly with cover piece 13 between the respective positions, first connecting track 15 is designed, which is brought into the front area of casing 12. A sliding piece 21 is guided into connecting track 15. In FIG. 1, camera 11 is in the withdrawn position so that sliding piece 21 is recognizable in the back-end area of the first connecting track 15, whereby the back-end area forms a stop for camera 11. By contrast, in FIG. 2, sliding piece 21 is shown in the front-end area of connecting track 15, which also forms a stop for camera 11. The movement between the withdrawn position and the video image position of the camera is caused by an angling of a linkage piece 24, which is carried out as gear segment 24 and can be swiveled around rotational axis 18.

The angling of gear segment 24 takes place in the design example by drive pinion 14, which meshes with gear segment 24 like a comb and can be rotated. Drive pinion 14 can be incorporated onto a drive shaft from a rotational motor, which by right and left rotation causes a movement of camera 11 and cover piece 13 between the withdrawn position and the video image position. Casing 12 features one casing part 12a and a second casing part 12b, whereby several fastening pieces 32 are located on the second casing part 12b, by which casing 12 can be mounted to an intake piece or by which a drive unit can be fastened to casing 12, which works together with drive pinion 14. Sliding piece 21 can slide back and forth in connecting track 15 between the stops. The resulting path of motion of camera 11 and cover piece 13 is provided by the geometric design of connecting track 15.

Figure 3:
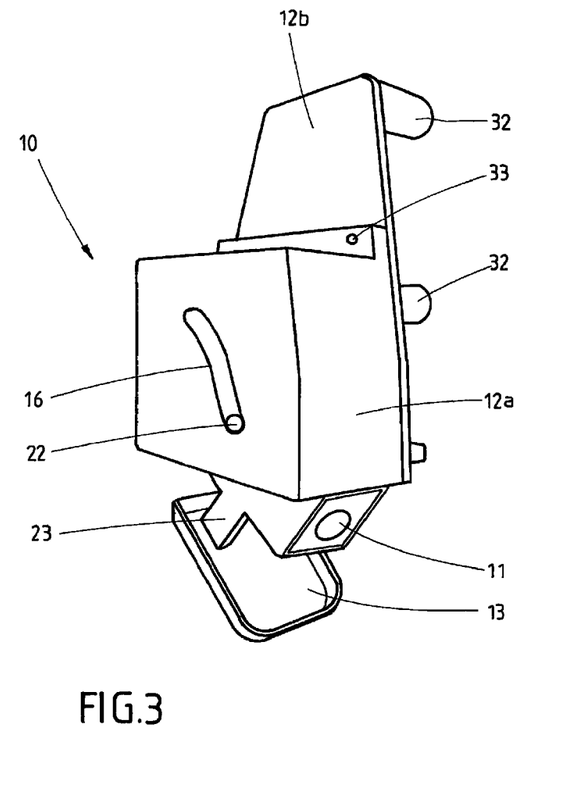

FIG. 3 shows a reverse view of camera unit 10 so that fastening pieces 32 are recognizable on the back side of the second casing part 12b. On the displayed backside of the first casing part 12a is the second connecting track 16, which runs parallel to the front side of the first connecting track 15. Camera 11 is shown in the video image position, whereby the attachment of cap piece 13 is shown on camera 11 via guide piece 23 in the form of an alternative design. In the video image position of camera 11, the rearward sliding piece 22 is in the anterior end position within the second connecting track 16. According to the design example, the two casing parts 12a and 12b are connected with each other via screw connection 33.

Figure 4:
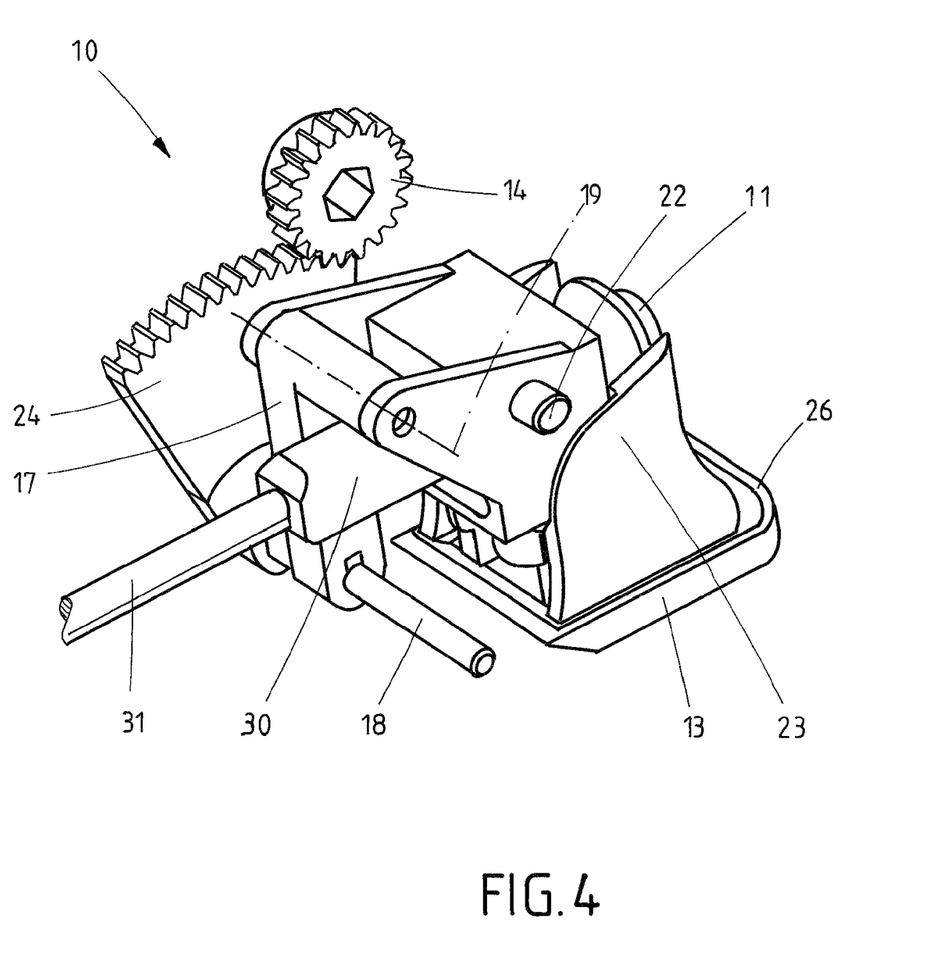
Figure 5:
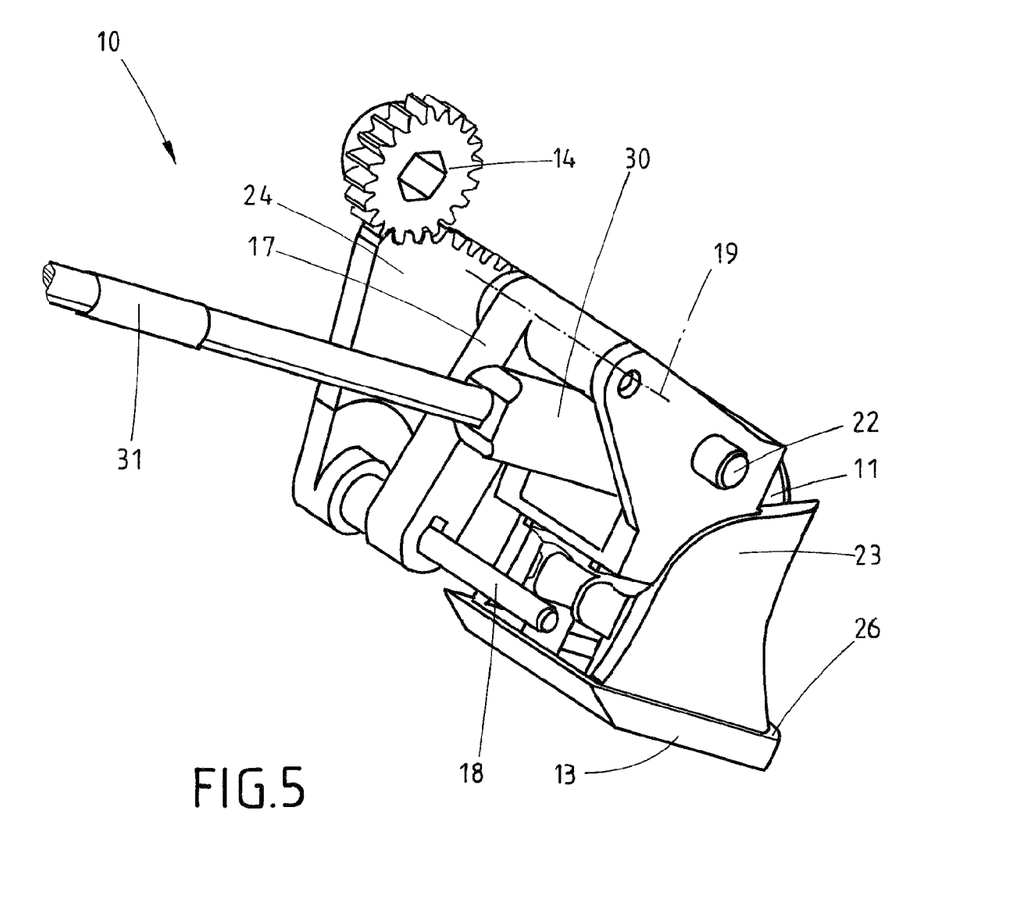

In FIGS. 4 and 5, camera unit 10 is shown without casing parts 12a and 12b of casing 12. In FIG. 4, camera unit 10 is shown in the withdrawn position of camera 11, whereas FIG. 5 reflects camera 11 in the video image position. The movement between the withdrawn position and the video image position of camera 11 is caused by a rotation of drive pinion 14. As a result, gear segment 24 swivels around rotational axis 18, whereby gear segment 24 meshes with the drive pinion 14 like a comb.

Lever piece 17 is connected with gear segment 24 in rotational axis 18 by a protrusion or a cam in a rotationally fixed manner such that lever piece 17 and gear segment 24 jointly can turn around rotational axis 18. If gear segment 24 swivels around rotational axis 18 from drive pinion 14, lever piece 17 also swivels. Camera 11 is loosely connected with lever piece 17 in connection axis 19. Camera 11 is guided by sliding pieces 21, 22, whereby presently only the front sliding piece 22 is recognizable. Sliding piece 22 is guided along connecting track 15 or 16, which is shown in FIGS. 1 through 3. An electrical contact piece 30 connects to the back of camera 11 to connect cable 31, in order to connect the camera 11 with other electronic components on board the motor vehicle.

As shown in the design form, cover piece 13 is brought over guide piece 23 in the casing of camera 11. As a result, both the movement of camera 11 between the withdrawn position and the video image position and the movement of cover piece 13 between the closed position and the open position are simultaneously possible by means of a linkage of gear segment 24 between the positions shown in FIG. 4 and FIG. 5. The rotational axis 18 is incorporated into casing 12 in a rotatable fashion, whereby both lever piece 17 and gear segment 24 are set on rotational axis 18 in a torque-proof way. By connection axis 19, an axis can also extend in order to loosely connect the fork-shaped part of camera 11, which possesses a type of casing, with lever piece 17. The position of camera 11 and cover piece 13 is determined by the entire movement, firstly from the guide of sliding pieces 21 and 22 into tracks 15 and 16 and secondly from the guide of connection axis 19 between lever piece 17 and the casing of camera 11.

The invention is not limited in design to the previously stated, preferred design example. Rather, a number of variants are conceivable, which use the displayed solution also for essentially different types of designs. All features and/or advantages arising out of the claims, the description or the drawings, including construction-related details, spatial locations or procedural steps can be essential to the invention both in themselves and in the most varied combinations. In particular, the invention assumes that camera 11 does not eject cover piece 13 because camera 11 is connected with cover piece 13 through a fixed connection via guide piece 23 that acts as a stopping piece.

The invention claimed is:

1. Device with a camera unit, which serves to capture video images of an external area of a motor vehicle, comprising: a camera, which is incorporated into a casing of the camera unit and can move between a withdrawn position and a video image position, whereby at least one connecting track is designed to guide the movement of the camera between the withdrawn position and the video image position and whereby at least one sliding piece is located on the camera, the sliding piece is guided in the connecting track to guide the movement of the camera between the withdrawn position and the video image position, whereby one cover piece is provided that serves to close an opening present in the casing, if the camera is in the withdrawn position, wherein the cover piece is located on the camera directly or over at least one guide piece, and whereby a configuration of the cover piece on the camera is preferably formed as a fixed configuration so that the cover piece can move with the movement of the camera between a closed position and an open position wherein the movement of the camera can be generated by a drive unit, whereby an operative connection between the drive unit and the camera includes a lever piece, wherein a linkage piece that is located outside of the casing and is connected with the lever piece on the rotational axis in a way that the rotation is transferred, such that upon linking the linkage piece by the drive unit, the lever piece can be turned on the rotational axis.

2. Device according to claim 1, wherein the cover piece is located on the camera and moves with the movement of the camera between the closed position and the open position.

3. Device according to claim 1, wherein the at least one connecting track is brought into the casing of the camera unit, whereby the casing can preferably feature two, plane-parallel and spaced casing walls opposite of each other and a first connecting track is present in a first casing wall and a second connecting track is present in a second casing wall.

4. Device according to claim 1, wherein the camera is preferably connected loosely with the lever piece in a connection axis so that a position of the camera in the casing is defined via the entire movement of the camera, first through the guide of the sliding piece in the connecting track, and second through the position of the connection axis.

5. Device according to claim 1, wherein a drive pinion is provided that can be rotated by the drive unit, whereby linkage piece is designed as gear segment, which meshes with the drive pinion like a comb.

6. Device according to claim 1, wherein the camera can at least partially be backed removed from an opening in the casing in the video image recording position, and the cover piece, in the closed position, can be brought against the opening, whereby a sealing piece can preferably be located between the opening and the cover piece.

7. Device according to claim 1, wherein the drive unit is designed as an electromechanical drive unit with self-locking, such that a movement of the lever piece is exclusively enabled by activation of the drive unit.

8. Device according to claim 1, wherein the drive unit is designed as a rotating motor and/or as a central locking actuator, whereby the drive unit designed as a central locking actuator is preferably designed to activate central locks of the motor vehicle.

9. Device according to claim 1, wherein the connecting track features an S-shaped pathway with at least one peak.

10. Device according to claim 9, wherein the S-shaped pathway of the connecting track is designed in such a way, and the peak can be located in such a way, that a space of movement of the camera necessary to reach the video image position, and the cover element, is minimal, and/or the video image position of the camera and the cover piece only require a minimum amount of space.

11. Device according to claim 9 wherein the S-shaped pathway of the connecting track is designed in such a way, and the peak is located in such a way that the movement of the camera and movement pieces located on it, cross over from the withdrawn position into the video image position by changing from a swiveling movement into a linear motion.

12. Device according to claim 10 wherein the S-shaped pathway of the connecting track is designed in such a way, and the peak is located in such a way that the movement of the camera and movement pieces located on it, cross over from the withdrawn position into the video image position by changing from a swiveling movement into a linear motion.

* * * * *